United States Patent
Wasily

(10) Patent No.: US 8,233,534 B2
(45) Date of Patent: Jul. 31, 2012

(54) FRAME BUFFER COMPRESSION AND MEMORY ALLOCATION IN A VIDEO DECODER

(75) Inventor: Nabil Yousef Wasily, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 295 days.

(21) Appl. No.: 12/757,438

(22) Filed: Apr. 9, 2010

(65) Prior Publication Data

US 2011/0249723 A1  Oct. 13, 2011

(51) Int. Cl.
*H04N 7/01* (2006.01)
*H04N 9/80* (2006.01)
*G06F 15/16* (2006.01)

(52) U.S. Cl. .................. 375/240.03; 386/248; 386/232; 386/332; 709/231

(58) Field of Classification Search .......... None
See application file for complete search history.

(56) References Cited

U.S. PATENT DOCUMENTS

| 2007/0047659 | A1* | 3/2007 | Aleksic | 375/240.25 |
| 2007/0081590 | A1* | 4/2007 | Goh et al. | 375/240.03 |
| 2008/0260045 | A1* | 10/2008 | Rodriguez et al. | 375/240.26 |

OTHER PUBLICATIONS

Penumutchu et al., Understanding H.264 Decoder Buffer Mechanism for TMS320DM365, Dec. 2009, Texas Instruments, SPRAB88, pp. 1-4.*

* cited by examiner

*Primary Examiner* — Joseph Ustaris
*Assistant Examiner* — William Adrovel
(74) *Attorney, Agent, or Firm* — Rahman LLC

(57) ABSTRACT

Frame buffer video compression on an input video stream to efficiently allocate and utilize memory used for storing reference frames in a video decoder includes parsing a video header to obtain a maximum number of reference frames (N), dividing an available frame buffer memory to hold [N+1] compressed frames, controlling a compression process to limit a size of each frame such that said size is not less than a frame buffer memory size divided by [N+1], parsing messages that contain reference frames by looking ahead in an input video stream buffer of the input video stream, and allocating memory for compressing a given reference frame based on a number of needed frames at a frame buffer. A quantization of the compression process may be adjusted to improve a picture quality of the input video stream.

20 Claims, 6 Drawing Sheets

FRAME BUFFER COMPRESSION AND MEMORY ALLOCATION IN A VIDEO DECODER

BACKGROUND

1. Technical Field

The embodiments herein generally relate to video decoding, and, more particularly, to an adaptive technique for frame buffer video compression and memory allocation in a video decoder.

2. Description of the Related Art

Video is composed of successive images called frames and each frame is composed of n×m pixels. A pixel is the smallest single component of an image which holds the brightness and color information of the image frame at a particular coordinate. Video applications such as video telephony and digital TV involve low bandwidth data transmission. When video is streamed over a wireless network for such applications, due to the low bandwidth there is a possibility of the data transmission being error prone. To overcome such problems, digital video compression standards have been defined by ISO and ITU such as MPEG-1, MPEG-2, MPEG-4, MPEG-7, H.261, H.263 and H.264. These compression standards typically achieve desirable reductions in frame data by comparing adjacent frames and removing details which are unchanged between two frames.

In most compression algorithms some form of loss in the decoded picture is expected. One approach that reduces this loss is by quantizing the signal in the transform domain instead of the pixel domain. Examples of such transforms are the Discrete Cosine Transform (DCT) the wavelet transforms and the sub band analysis filters. In a transform based compression algorithm, the picture is converted into the transform domain and a quantization scheme is applied to the coefficients to reduce the amount of information. The transformation has the effect of concentrating the energy into a few coefficients and noise can be introduced into these coefficients without affecting the perceived visual quality of the reconstructed picture.

I-frame, or "Intra-coded" frame is a reference frame that uses a block of 8×8 pixels within the frame to code itself. P-frame, or "Predictive" frame uses previous I-type or P-type frames as a reference to code the difference. FIG. 1 illustrates a conventional video compression technique with an I-frame as a reference frame and subsequent P-frames referencing the I-frame and previous P-frames. Each frame of n×m pixels is divided into blocks of 8×8 pixels. An I-frame 102, which is a reference frame, is sent first. It is followed by a $P_1$-Frame 104, a $P_2$-Frame 106, and so on. The P-Frames such as P1-Frame 104 and $P_2$-Frame 106 are referenced to the I-frame 102 as well as the previous sent P-frames as shown in FIG. 1. Each 8×8 pixels block of a P-Frame is compared to the blocks of the I-Frame 102, so that every block of a P-Frame can be expressed as a simple displacement and rotation of pixels. The referencing of P-frames to the I-frame 102 as well previously sent P-frames is done up to N frames. In the H.264 standard, the number of frames N is 16.

These frames are stored in a frame buffer as part of the memory. In the conventional video compression technique of FIG. 1, substantial memory is required to be allocated for storing the N compressed frames. Most of the time, only one reference frame is used but still the rest of the N−1 Frames consume memory. Moreover, when a certain frame is being decoded, the frame that will refer to it in the future is not known. Since memory is limited, there is a need for an improved technique for frame buffer video compression that can reduce memory allocated for frame buffers significantly.

SUMMARY

In view of the foregoing, an embodiment herein provides a method for frame buffer video compression on an input video stream to efficiently allocate and utilize memory used for storing reference frames in a video decoder. The method includes parsing a video header to obtain a maximum number of reference frames (N), dividing an available frame buffer memory to hold [N+1] compressed frames, controlling a compression process to limit a size of each frame such that the size is not less than a frame buffer memory size divided by [N+1], parsing messages that contain reference frames by looking ahead in an input video stream buffer of the input video stream, and allocating memory for compressing a given reference frame based on a number of needed frames at a frame buffer.

A quantization of the compression process may be adjusted to improve a picture quality of the input video stream. Each of the reference frames is compressed using a JPEG image compression technique and stored in the memory. The compression process is controlled in a quantization stage by dividing the input by a quantization matrix. Only reference frames are compressed and stored in the frame buffer. Each frame is decoded by looking ahead in the frame buffer to determine which frames are reference frames. The messages are parsed based on information about the reference frames. The information includes slice headers.

If only one reference frame is needed in which the reference frame requires a memory equal to the size of frame buffer memory divided by [N+1], then quantization of the compression technique is adjusted to increase picture quality and avoid compression artifacts. The quantization matrix is adjusted to limit an output size to the size of frame buffer memory divided by [N+1]. The incoming video stream is stored in a buffer at an input to the video decoder. The input video stream is an analog input video stream.

In another aspect, video decoders that performs buffer video compression on an input video stream and efficiently allocates and utilize memory used for storing reference frames is provided. The video decoder includes a frame buffer, a parsing unit that parses a video header of the input video stream to obtain a maximum number of reference frames (N) and parse messages that contain reference frames by looking ahead in the frame buffer, a memory allocation unit that divides an available memory of a frame buffer to hold [N+1] compressed frames and allocate memory for compressing a given reference frame based on a number of needed frames at the frame buffer at a given instance, and a compression control unit that controls a compression process to limit the size of each frame such that the size is not less than the memory size divided by [N+1].

The compression control unit includes a quantization adjustment unit that divides the input by a quantization matrix and controls the compression process in a quantization stage. Each frame is decoded by looking ahead in the frame buffer to determine which frames are the reference frames. Each of the reference frames are compressed using a JPEG image compression technique and stored in the memory. If only one reference frame is needed in which the reference frame requires a memory equal to the size of frame buffer memory divided by two, then the quantization adjustment unit adjusts a quantization of the compression technique to increase picture quality and avoid compression artifacts.

The memory allocation unit removes frames that are not reference frames from the frame buffer. The parsing unit parses the messages based on information about the reference frames. The information includes slice headers. The quantization matrix is adjusted to limit an output size to the size of frame buffer memory divided by [N+1]. A first frame is decoded by looking ahead three frames to know which frames are the reference frames, and only reference frames are compressed and stored in the frame buffer. When a fourth frame is decoded, half of the frame buffer is allocated for a third reference frame and only one-fourth of the frame buffer is allocated for the fourth frame. The input video stream is an analog input video stream.

In yet another aspect, a system for performing frame buffer video compression on an input video stream to efficiently allocate and utilize memory used for storing reference frames in a video decoder is provided. The system includes means for parsing a video header to obtain a maximum number of reference frames (N), means for dividing an available frame buffer memory to hold [N+1] compressed frames, means for controlling a compression process to limit a size of each frame such that the size is not less than a frame buffer memory size divided by [N+1], means for parsing messages that contain reference frames by looking ahead in an input video stream buffer of the input video stream. The messages are parsed based on information about the reference frames. The information includes slice headers.

The system further includes means for allocating memory for compressing a given reference frame based on a number of needed frames at a frame buffer. Each of the reference frames is compressed using a JPEG image compression technique and stored in the memory, and the compression process is controlled in a quantization stage by dividing the input by a quantization matrix. The quantization matrix is adjusted to limit an output size to the size of frame buffer memory divided by [N+1]. Only reference frames are compressed and stored in the frame buffer and each frame is decoded by looking ahead in the frame buffer to determine which frames are reference frames.

The system further includes means for adjusting a quantization of the compression process to improve a picture quality of the input video stream. If only one reference frame is needed in which the reference frame requires a memory equal to the size of frame buffer memory divided by two, then quantization of the compression technique is adjusted to increase picture quality and avoid compression artifacts. The incoming video stream is stored in a buffer at an input to the video decoder. The input video stream is an analog input video stream.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
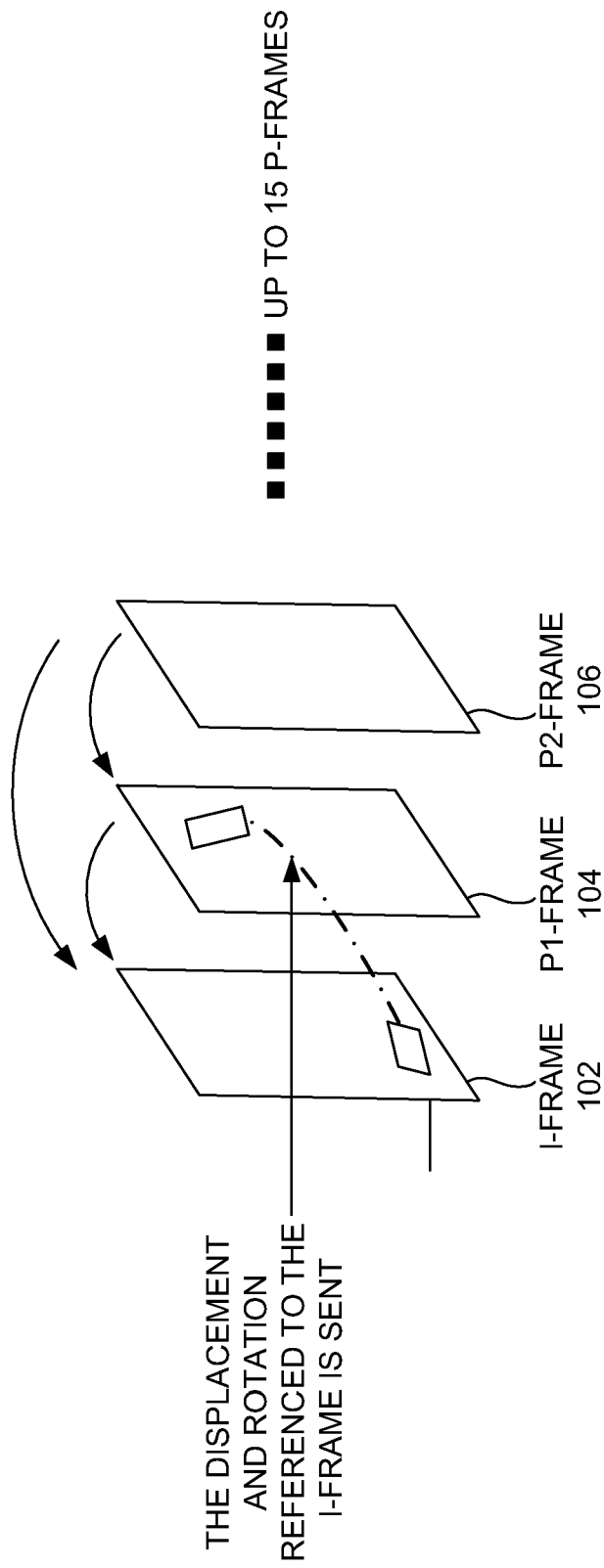
FIG. 1 illustrates a conventional video compression technique with an I-frame as a reference frame and subsequent P-frames referencing the I-frame and previous P-frames.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an improved technique for frame buffer video compression that can reduce memory allocated for frame buffers significantly. The embodiments herein achieve this by providing a method for frame buffer video compression on an input video stream to efficiently allocate and utilize memory used for storing reference frames in a video decoder. Referring now to the drawings, and more particularly to FIGS. 2 through 6, where similar reference characters denote corresponding features consistently throughout the figures, there are shown preferred embodiments.

Figure 2:
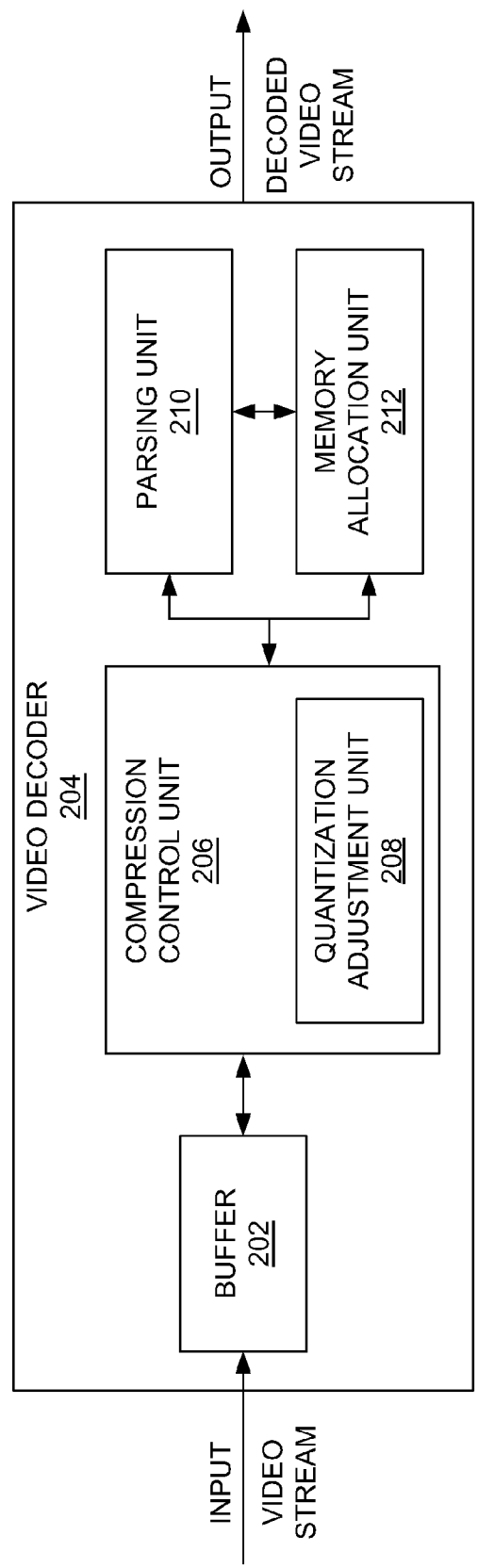
FIG. 2 is a block diagram illustrating a video decoder having a compression control unit, a parsing unit, and a memory allocation unit according to an embodiment herein.

FIG. 2 is a block diagram illustrating a video decoder 204 having a compression control unit 206, a parsing unit 210 and a memory allocation unit 212 according to an embodiment herein. An input video stream 202 is stored in a buffer 202 at an input to the video decoder 204. The compression control unit 206 may include a quantization adjustment unit 208. The parsing unit 210 may parse video headers of the input video stream 202 to obtain a maximum number of reference frames (N). Further, the parsing unit 210 may parse messages that contain references frames by looking ahead in the buffer (e.g., the compressed frame buffer 400 of FIG. 4).

In one embodiment, for a H.264 standard, the message containing information about the referenced frames is called a slice header. The video headers may be supplemental information about transmitted data. In one embodiment, for H.264, the maximum number of reference frames (N) is signaled in a message called the SPS (Sequence Parameter set). The memory allocation unit 212 may divide an available frame buffer memory to hold [N+1] compressed frames. This is based on an assumption for the maximum number of compressed frames. Thus the memory available for each reference frame would be equal to the memory size divided by [N+1].

Each reference frame is then compressed using an image compression technique such as JPEG and stored in the memory. The memory allocation unit 212 allocates memory for compressing a given reference frame based on the number of needed frames at the frame buffer at a given instance.

The compression control unit 206 may control a compression process so as to limit the size of each frame to the memory size divided by [N+1]. In one embodiment, the JPEG standard is used for compression. The quantization adjustment unit 208 controls the compression in a quantization stage. The input is divided by a quantization matrix. The quantization adjustment unit 208 adjusts the quantization matrix to limit the output size to the memory size divided by [N+1]. If only one reference frame is needed (e.g. of memory equal to the memory size divided by [N+1]) the quantization adjustment unit 208 may adjust the quantization of the compression technique to get a better picture quality and avoid compression artifacts.

Figure 3:
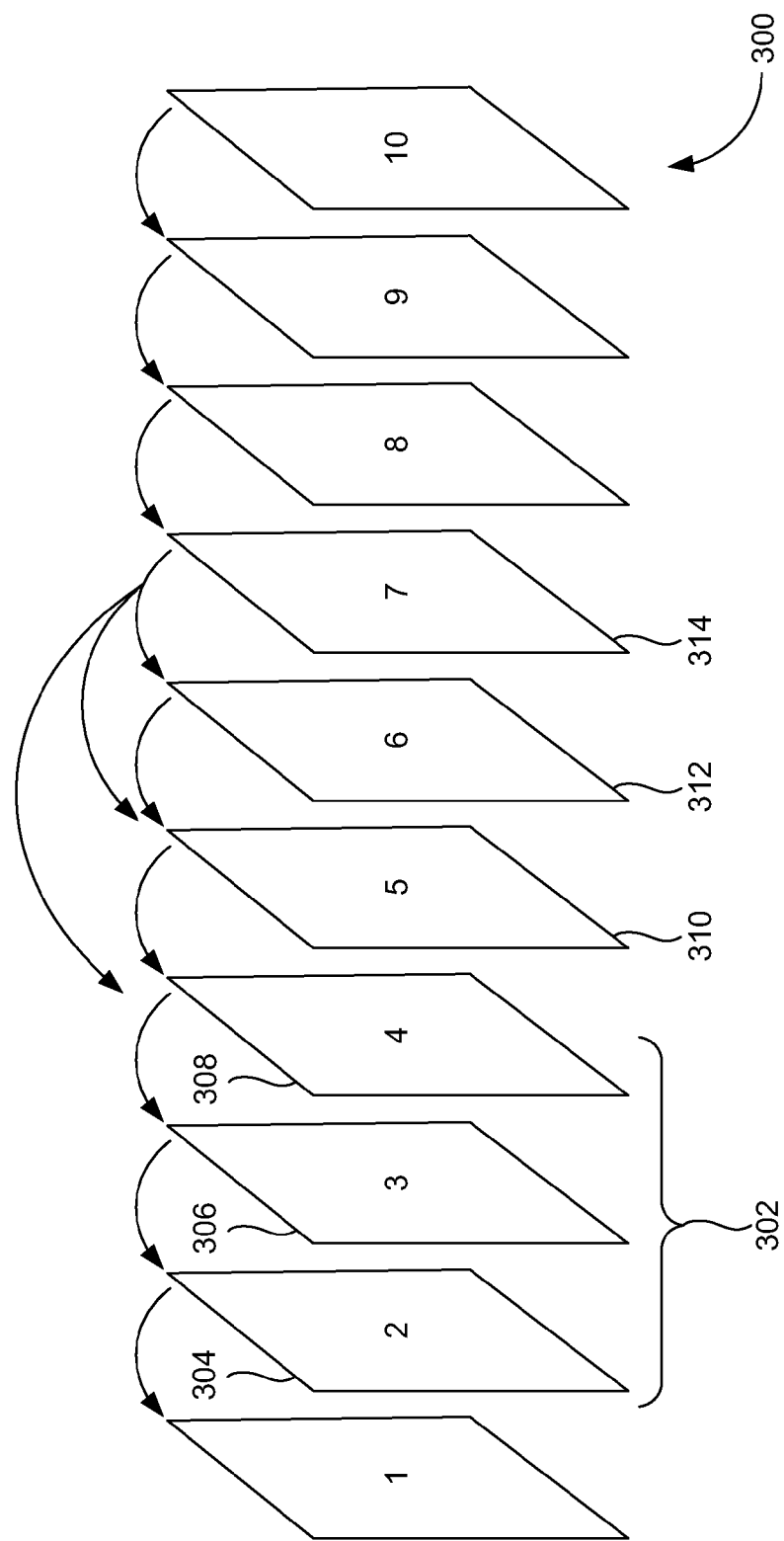
FIG. 3 illustrates a frame sequence in an input video stream having a maximum number of reference frames (N) equal to three and the number of frames to be received and decode is equal to ten according to an embodiment herein.

FIG. 3 illustrates a frame sequence 300 in an input video stream having a maximum number of reference frames (N) equal to three (frames 304-308, collectively shown as 302) according to an embodiment herein. Each new frame in the sequence 300 is referenced to the frame that precedes it. The $7^{th}$ frame 314 references to the previous frame which is the $6^{th}$ frame 312. In addition, the $7^{th}$ frame 314 references to the $5^{th}$ frame 310 and the $4^{th}$ frame 308 as shown in FIG. 3. The total number of frames is [N+1] which is equal to 10.

The memory available for each reference frame is therefore equal to the memory size divided by four. In the frame sequence 300, messages that contain reference frames are parsed by looking ahead 3 frames in the input video stream buffer, since the number of reference frames is 3. In one embodiment, the $1^{st}$ frame is decoded by looking ahead three frames of the reference frame set 302 to know which frames are reference frames. Only reference frames are compressed and stored in the frame buffer.

Figure 4:
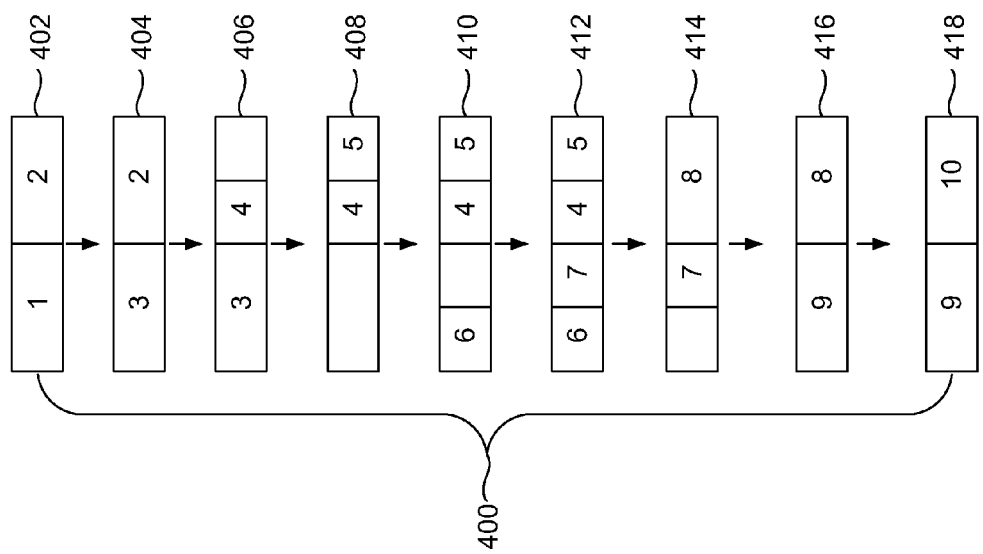
FIG. 4 illustrates a process of memory allocation of a compressed frame buffer in the frame sequence of FIG. 3 according to an embodiment herein.

FIG. 4 illustrates a process of memory allocation of the compressed frame buffer 400 in the frame sequence 300 of FIG. 3 according to an embodiment herein. The compressed frame buffer 400 is allocated memory based on the memory requirements of the reference frame and the frame to be decoded at various steps in the frame decoding process of the frame sequence 300. At step 402 of the memory allocation process, frame 2 is decoded, for which only frame 1 is a reference. Thus half of the compressed frame buffer 400 is allocated for the reference frame 1 and the other half is allocated for frame 2 itself to be decoded. At step 404, frame 3 is decoded, for which only frame 2 is a reference. Thus frame 1 is not needed anymore and is removed.

At step 406, frame 4 is decoded, for which only frame 3 is a reference. Thus half of the compressed frame buffer 400 is allocated for the reference frame 3 and only one-fourth of the compressed frame buffer 400 is allocated for frame 4. Frame 4 will be needed later for decoding frame 7 and so its maximum allocation cannot exceed ¼. At step 408, frame 5 is decoded, for which only frame 4 is needed for reference. Hence frame 3 is removed. Only one-fourth of the compressed frame buffer 400 is allocated for frame 5 as it will be needed later for decoding frame 7. So the maximum allocation for frame 5 cannot exceed ¼. At step 410, frame 6 is decoded, for which only frame 5 is needed for reference. However, frame 4 will be needed later for decoding frame 7 and so it will not be removed.

As frame 6 is needed as well, only one-fourth of the compressed frame buffer 400 will be allocated for its decoding. At step 412, frame 7 is decoded. Frame 4, 5 and 6 are compressed and stored in the memory as a reference to decode frame 7. At step 414, frame 8 is decoded. Frame 4, 5 and 6 are no more needed as frame 8 needs only frame 7 (e.g., 314 of FIG. 3) for referencing as shown in FIG. 3. Half of the compressed frame buffer 400 is allocated for frame 8, since it is not needed as a reference for subsequent frames. At step 416, frame 9 is decoded. Frame 7 is removed while frame 8 is kept as a reference for frame 9. Half of the compressed frame buffer 400 is then allocated for frame 9. At step 418, frame 10 is decoded. Frame 8 is removed while frame 9 is kept as a reference for frame 10. Half of the compressed frame buffer 400 is allocated for frame 10.

Figure 5:
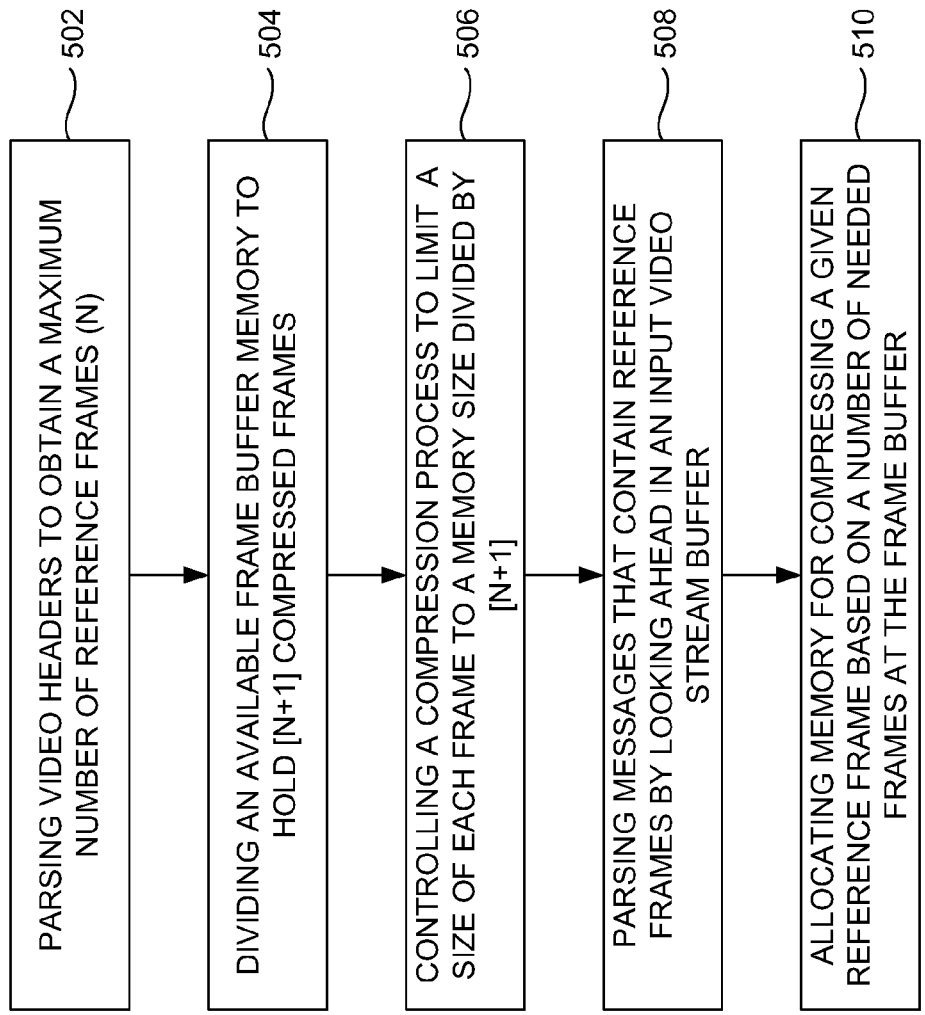
FIG. 5 is a flow diagram illustrating an adaptive technique for frame buffer compression and memory allocation according to an embodiment herein.

FIG. 5, with reference to FIGS. 2 through 4, is a flow diagram illustrating an adaptive technique for frame buffer compression and memory allocation according to an embodiment herein. At step 502, video headers are parsed to obtain a maximum number of reference frames (N). The video headers may be supplemental information about transmitted data. In one embodiment, for H.264, the maximum number of reference frames (N) is signaled in a message called the SPS (Sequence Parameter set). At step 504, an available frame buffer memory is divided to hold [N+1] compressed frames. This is based on an assumption for the maximum number of compressed frames. Thus the memory available for each reference frame would be equal to the memory size divided by [N+1]. Each reference frame is then compressed using an image compression technique such as JPEG and stored in the memory.

At step 506, the compression process is controlled so as to limit the size of each frame such that its size is not less than the memory size divided by [N+1]. In one embodiment, the JPEG standard is used for compression, in which the compression can be controlled in the quantization stage. The input is divided by a quantization matrix. The quantization matrix can be adjusted to limit the output size to the memory size divided by [N+1]. Then the incoming video stream is stored in a buffer at the input to the video decoder (e.g., the video decoder 204).

At step 508, the messages that contain references frames are parsed by looking ahead in the input video stream buffer. In one embodiment, for a H.264 standard, the message containing information about the referenced frames is called a slice header. At step 510, the allocated memory is adapted for compressing a given reference frame based on the number of needed frames at the frame buffer at a given instance. If only one reference frame is needed (e.g. of memory equal to the memory size divided by [N+1]), the quantization of the compression technique is adjusted accordingly to get better picture quality and avoid compression artifacts.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can comprise hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/0 controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
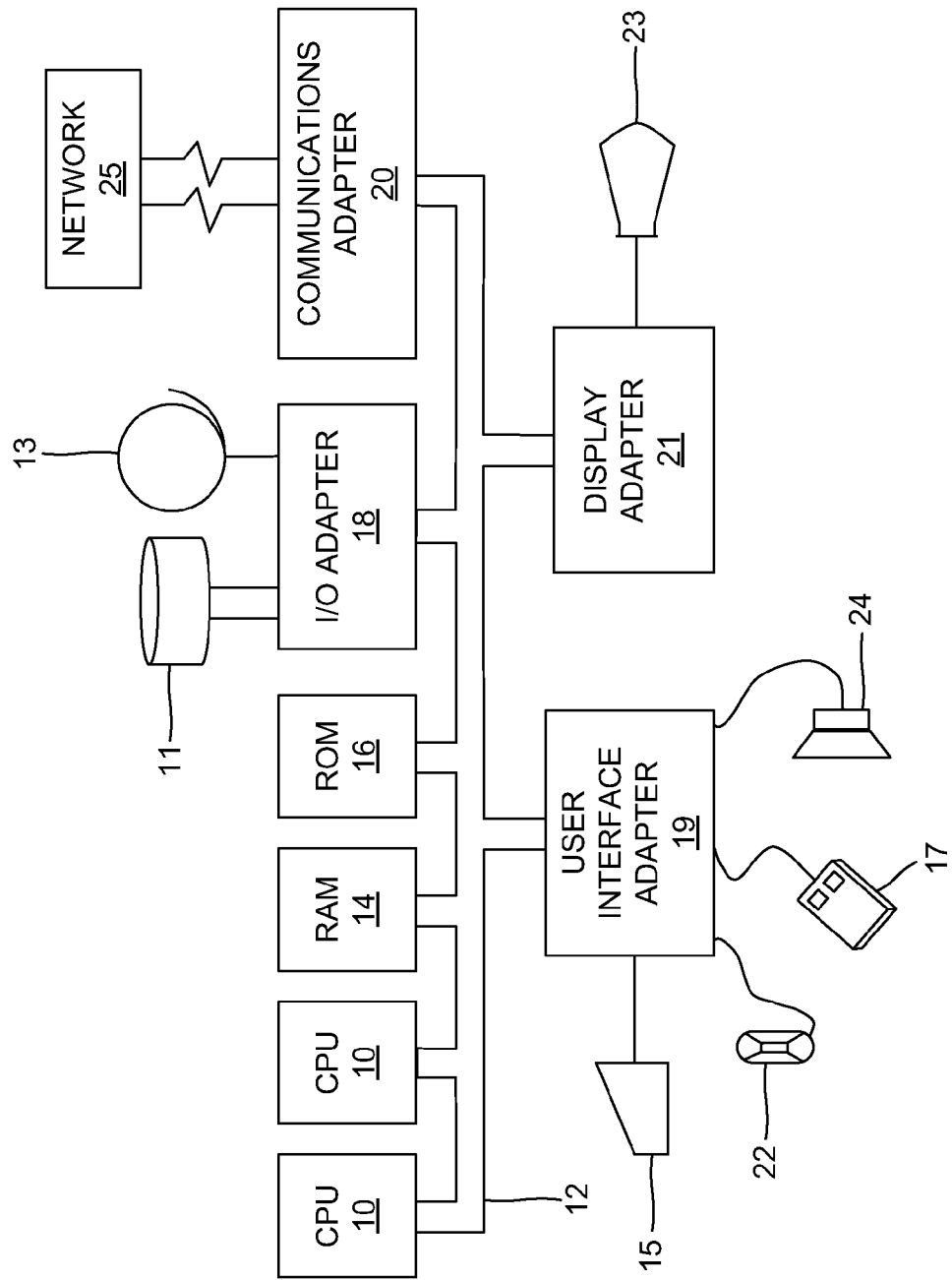
FIG. 6 illustrates a schematic diagram of a computer architecture used in accordance with the embodiments herein.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example. The method for frame buffer video compression on an input video stream efficiently allocates and utilizes memory used for storing reference frames in a video decoder. The allocated memory is adapted for compressing a given reference frame based on the number of needed frames at the frame buffer at a given instance. If only one reference frame is needed a quantization of the compression technique is adjusted accordingly to get better picture quality and avoid compression artifacts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for frame buffer video compression on an input video stream to efficiently allocate and utilize memory used for storing reference frames in a video decoder, said method comprising:

parsing a video header to obtain a maximum number of reference frames N;

dividing an available frame buffer memory to hold N+1 compressed frames;

controlling a compression process to limit a size of each frame such that said size is not less than a frame buffer memory size divided by N+1;

parsing messages that contain reference frames by looking ahead in an input video stream buffer of said input video stream; and allocating memory for compressing a given reference frame based on a number of needed frames at a frame buffer, wherein a first frame is decoded by looking ahead three frames to know which frames are said reference frames, and only reference frames are compressed and stored in said frame buffer, and wherein when a fourth frame is decoded, half of said frame buffer is allocated for a third reference frame and only one-fourth of said frame buffer is allocated for said fourth frame.

2. The method of claim 1, further comprising adjusting a quantization of said compression process to improve a picture quality of said input video stream.

3. The method of claim 1, wherein each of said reference frames is compressed using a JPEG image compression technique and stored in said memory, and said compression process is controlled in a quantization stage by dividing said input by a quantization matrix.

4. The method of claim 1, wherein said messages are parsed based on information about said reference frames, said information comprising slice headers.

5. The method of claim 3, wherein if only one reference frame is needed in which said reference frame requires a memory equal to said size of frame buffer memory divided by N+1, the quantization of the compression technique is adjusted to increase picture quality and avoid compression artifacts.

6. The method of claim 3, wherein said quantization matrix is adjusted to limit an output size to said size of frame buffer memory divided by N+1.

7. The method of claim 1, wherein said incoming video stream is stored in a buffer at an input to said video decoder.

8. The method of claim 1, wherein said input video stream comprises an analog input video stream.

9. A video decoder that performs buffer video compression on an input video stream and efficiently allocate and utilize memory used for storing reference frames, said video decoder comprising:
a frame buffer;
a parsing unit that parses a video header of said input video stream to obtain a maximum number of reference frames N and parse messages that contain reference frames by looking ahead in said frame buffer;
a memory allocation unit that divides an available memory of a frame buffer to hold N+1 compressed frames and allocate memory for compressing a given reference frame based on a number of needed frames at said frame buffer at a given instance; and
a compression control unit that controls a compression process to limit the size of each frame such that said size is not less than the memory size divided by N+1, said compression control unit comprising a quantization adjustment unit that divides said input by a quantization matrix and controls said compression process in a quantization stage, wherein each frame is decoded by looking ahead in said frame buffer to determine which frames are said reference frames,
wherein a first frame is decoded by looking ahead three frames to know which frames are said reference frames, and only reference frames are compressed and stored in the frame buffer, and
wherein when a fourth frame is decoded, half of said frame buffer is allocated for a third reference frame and only one-fourth of said frame buffer is allocated for said fourth frame.

10. The video decoder of claim 9, wherein each of said reference frames is compressed using a JPEG image compression technique and stored in said memory.

11. The video decoder of claim 10, wherein if only one reference frame is needed in which said reference frame requires a memory equal to said size of frame buffer memory divided by two, said quantization adjustment unit adjusts a quantization of said compression technique to increase picture quality and avoid compression artifacts.

12. The video decoder of claim 9, wherein said memory allocation unit removes frames that are not reference frames from said frame buffer.

13. The video decoder of claim 12, wherein said parsing unit parses said messages based on information about said reference frames, said information comprising slice headers.

14. The video decoder of claim 9, wherein said quantization matrix is adjusted to limit an output size to said size of frame buffer memory divided by N+1.

15. The video decoder of claim 9, wherein said input video stream comprises an analog input video stream.

16. A system for performing frame buffer video compression on an input video stream to efficiently allocate and utilize memory used for storing reference frames in a video decoder, said system comprising:
means for parsing a video header to obtain a maximum number of reference frames N;
means for dividing an available frame buffer memory to hold N+1 compressed frames; and
means for controlling a compression process to limit a size of each frame such that said size is not less than a frame buffer memory size divided by N+1;
means for parsing messages that contain reference frames by looking ahead in an input video stream buffer of said input video stream, wherein said messages are parsed based on information about said reference frames, said information comprising slice headers;
means for allocating memory for compressing a given reference frame based on a number of needed frames at a frame buffer,
wherein each of said reference frames is compressed using a JPEG image compression technique and stored in said memory, and said compression process is controlled in a quantization stage by dividing said input by a quantization matrix,
wherein said quantization matrix is adjusted to limit an output size to said size of frame buffer memory divided by N+1,
wherein only reference frames are compressed and stored in the frame buffer, and each frame is decoded by looking ahead in said frame buffer to determine which frames are reference frames,
wherein a first frame is decoded by looking ahead three frames to know which frames are said reference frames, and only reference frames are compressed and stored in said frame buffer, and
wherein when a fourth frame is decoded, half of said frame buffer is allocated for a third reference frame and only one-fourth of said frame buffer is allocated for said fourth frame.

17. The system of claim 16, further comprising means for adjusting a quantization of said compression process to improve a picture quality of said input video stream.

18. The system of claim 17, wherein if only one reference frame is needed in which said reference frame requires a memory equal to said size of frame buffer memory divided by two, the quantization of the compression technique is adjusted to increase picture quality and avoid compression artifacts.

19. The system of claim 16, wherein said incoming video stream is stored in a buffer at an input to said video decoder.

20. The system of claim 16, wherein said input video stream comprises an analog input video stream.

* * * * *